A. E. LOWENTHAL.
SADDLE FOR MOTOR CYCLES AND THE LIKE.
APPLICATION FILED SEPT. 3, 1912.

1,076,655.

Patented Oct. 21, 1913.

Witnesses
Howard F. Costello.
Irv. L. McCathran.

Inventor
Albert E. Lowenthal
By C. C. Vrooman,
Attorney

UNITED STATES PATENT OFFICE.

ALBERT EDWARD LOWENTHAL, OF MOSELEY, ENGLAND.

SADDLE FOR MOTOR-CYCLES AND THE LIKE.

1,076,655.        Specification of Letters Patent.      Patented Oct. 21, 1913.

Application filed September 3, 1912. Serial No. 718,371.

*To all whom it may concern:*

Be it known that I, ALBERT EDWARD LOWENTHAL, a subject of the King of Great Britain, residing at "Sunbury," Mayfield Road, Moseley, in the county of Worcestershire, England, have invented certain new and useful Improvements in Saddles for Motor-Cycles and the like, of which the following is a specification.

This invention has reference to certain improvements in saddles for motor cycles and the like and has for its object to provide stability and prevent swaying or rocking as is the case with single pillar hangers, either passing through or outside the extension coils.

In accordance with my invention I provide a pair of two pillar hangers so devised as to be fixed to the cantle or back plate of the saddle by means of bolts or rivets and to the downwardly extending extremities of the said two pillar hangers I attach the lower ends of the extension springs, their opposite ends being connected to the usual girder frame for attachment to the seat pillar of the machine. This arrangement may be duplicated, similar two pillar hangers being secured to a steel plate fixed in front and beneath the saddle in like manner. In detailed construction each individual member of the said two pillar-hangers is bent into a double downwardly extending and rigid structure whose lower end is formed with an angular bend and curled into a loop or eye for the attachment of one end of the extension spring to said member by a bolt and nut.

Other modifications of my invention may be devised without departing from the spirit of my invention.

Figure 1:
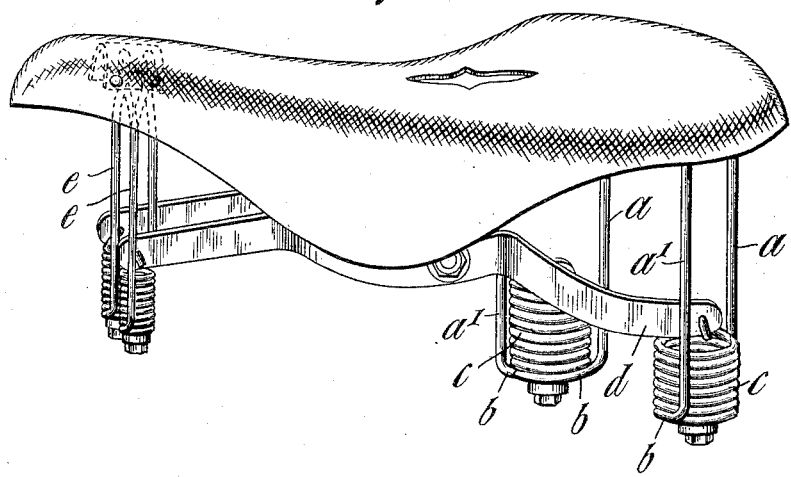
Figure 2:
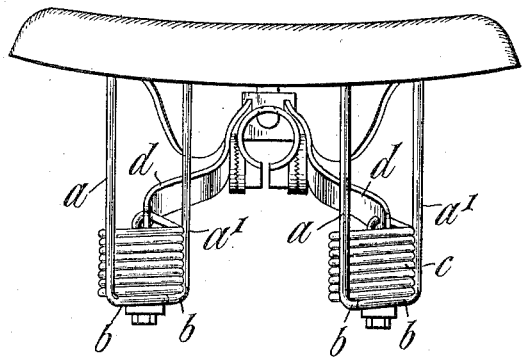

In the accompanying drawings Figure 1 is a perspective view of a saddle for motor cycles and the like fitted with the said two-pillar hangers at the front and back of the saddle in accordance with my invention. Fig. 2 is a rear view of a saddle with my invention applied showing the said two pillar hangers at the back of the saddle.

In the application shown in the drawings the said two pillar hangers at the rear end of the saddle have each individual member composed of a double downwardly extending rod structure $a$ $a'$ whose lower end is formed with an angular bend $b$ and curled into an eye or loop for the attachment of the lower end of each extension spring $c$ or other suitable means of attachment may be provided. The upper ends of such extension springs $c$ are connected to the ends of the girder frame $d$ of the saddle. The said two-pillar hangers and their connections may be applied to the rear of the saddle only as shown in Fig. 2 in which case the nose of the saddle is connected to the front of the girder in the usual way or they may be attached also at the front end of the saddle as shown in Fig. 1.

The pair of two-pillar hangers at the rear end of the saddle are fixed by bolts to or riveted into the cantle or back plate of the saddle, whereas the two pillar hangers or the like at the front end of the saddle having also each individual member composed of a double downwardly extending and parallel rod structure $e$ is secured to a steel plate fixed beneath the saddle, or the front of the saddle may be fixed to the front of the girder in the ordinary way. It will be seen that in this saddle an iron or wood foundation may be used, it may be attached to four extension springs as described, the usual tension springs or wires may be dispensed with and its general shape and construction are adapted to give comfort to the rider.

What I claim as my invention and desire to secure by Letters Patent of the United States is:—

In combination with a saddle provided with a girder frame, extension springs depending from the front and rear ends of said frame, pillar hangers depending from the saddle and arranged in pairs disposed on opposite sides of the springs, and means for connecting the lower ends of the hangers to the lower ends of the springs.

In testimony whereof I affix my signature in presence of two witnesses.

ALBERT EDWARD LOWENTHAL.

Witnesses:
   FRANCES HEWLETT,
   FLORENCE HATELEY.

---

Copies of this patent may be obtained for five cents each, by addressing the "Commissioner of Patents, Washington, D. C."